(12) United States Patent
Hatakeyama (10) Patent No.: US 8,670,492 B2
(45) Date of Patent: Mar. 11, 2014

(54) DATA COMMUNICATION SYSTEM AND DATA COMMUNICATION DEVICE

(75) Inventor: Takeshi Hatakeyama, Osaka (JP)

(73) Assignee: Panasonic Corporation, Osaka (JP)

( * ) Notice: Subject to any disclaimer, the term of this patent is extended or adjusted under 35 U.S.C. 154(b) by 233 days.

(21) Appl. No.: 13/144,310

(22) PCT Filed: Jan. 6, 2010

(86) PCT No.: PCT/JP2010/000033
§ 371 (c)(1),
(2), (4) Date: Jul. 13, 2011

(87) PCT Pub. No.: WO2010/082457
PCT Pub. Date: Jul. 22, 2010

(65) Prior Publication Data
US 2011/0286534 A1    Nov. 24, 2011

(30) Foreign Application Priority Data
Jan. 15, 2009   (JP) ................................. 2009-006477

(51) Int. Cl.
*H04B 3/00*   (2006.01)
(52) U.S. Cl.
USPC ............ 375/257; 375/224; 375/259; 375/260
(58) Field of Classification Search
USPC .......... 375/257, 224, 259, 260; 370/282, 338, 370/442, 466
See application file for complete search history.

(56) References Cited

U.S. PATENT DOCUMENTS

| | | | |
|---|---|---|---|
| 4,563,650 A * | 1/1986 | York et al. | 329/306 |
| 2007/0189242 A1* | 8/2007 | Hosokawa et al. | 370/338 |
| 2008/0068141 A1* | 3/2008 | Yokomitsu et al. | 340/310.11 |
| 2009/0190673 A1* | 7/2009 | Koga et al. | 375/257 |
| 2010/0172166 A1* | 7/2010 | Singh et al. | 363/131 |

FOREIGN PATENT DOCUMENTS

| | | |
|---|---|---|
| JP | 61-109431 | 5/1986 |
| JP | 63-18830 | 1/1988 |
| JP | 2001-230708 | 8/2001 |
| JP | 2008-294647 | 12/2008 |

OTHER PUBLICATIONS

International Search Report issued Feb. 2, 2010 in International (PCT) Application No. PCT/JP2010/000033.

* cited by examiner

*Primary Examiner* — Dhaval Patel
(74) *Attorney, Agent, or Firm* — Wenderoth, Lind & Ponack, L.L.P.

(57) ABSTRACT

A carrier wave is generated by using a zero-cross point of an AC power source voltage as a reference timing, a data communication device connected to a first power line performs digital modulation with a normal-phase carrier wave, and a data communication device connected to a second power line near the first power line performs digital modulation with an anti-phase carrier wave. In this manner, unwanted radiation caused by a leak radio wave can be reduced while using power lines of two systems in independent data communication.

13 Claims, 7 Drawing Sheets

DATA COMMUNICATION SYSTEM AND DATA COMMUNICATION DEVICE

BACKGROUND OF THE INVENTION

1. Technical Field

The present invention relates to a data communication system and a data communication device that perform high-speed data communication by using a power line (also referred to as an electric-light line hereinafter) built in a building or the like.

2. Background Art

In recent years, in a building such as in a house, in a shop, in an office, or in a factory, a system to perform high-speed interactive data communication by using a power line (in general, AC 100 V or 200 V) wiring laid down in the building has been popularized. In our country, standards of high-speed power line communication (PLC: Power Line Communication) are defined, and a home-use power line data communication device has been manufactured.

In a power line, a power signal flows with a 50-Hz or 60-Hz high power. In contrast to this, a signal for power line communication is transmitted with a low power in a very wide frequency range of 2 to 30 MHz. The signals of the two types can be easily separated from each other because the signals have entirely different frequencies. As a result, when the power line data communication device is only connected to an AC power source outlet in a room, data communication at up to about 100 Mbps (physical speed) can be interactively performed. Furthermore, even though three or more data communication devices to be connected can be available, any one of the data communication devices serves as a main device, and access control between the main device and a plurality of sub-devices is performed on a time axis to realize multi-access without a conflict on the power line.

When a network is to be installed in a house with power line communication, a LAN cable for Ethernet (registered trademark) need not be used. For this reason, a work for laying down a new LAN cable is not required, and an appearance can be advantageously prevented from being unsightly by stretching a cable around in the room. In terms of unnecessary wiring, a wireless LAN has the same characteristics as described above. However, since a radio wave may not be able to well reach a target point depending on structures or building materials of buildings, communication can be realized more stably in power line communication than in communication using a wireless LAN.

However, the power line communication has a problem of unwanted radiation. Since a general power line is a parallel vinyl-coated line having no electromagnetic shielding effect, the general power line does not has a shielding effect unlike a coaxial line. For this reason, a high-frequency signal flowing in a conductive wire leaks out as unwanted radiation. In a 2 to 30 MHz band used in power line communication, a large number of systems such as a ship or aviation radio, a short-wave broadcasting, a ham radio, and a radio observatory using weak radio waves are known, and levels of leak radio waves from power lines are strictly regulated. When viewed from a side that uses power line communication, a power of a communication signal needs to be set to be low to obey such a regulation. For this reason, performances such as a transmission distance and a transmission rate are restricted.

Therefore, a method in Patent Document 1 is proposed to reduce the leak radio wave. In Patent Document 1, by using a structure in which a power line is generally wired with three lines, i.e., a neutral line (ground line), a single-phase voltage A line, and a single-phase voltage B line, high-frequency signals in power line communication are transmitted to the single-phase voltage A line and the single-phase voltage B line to have opposite phases in carrier waves, i.e., in a differential relationship. For this reason, as information, the same pieces of information are transmitted by signals of two types, and the signals of the two types may be differentially received on a reception side. On the other hand, leak radio waves from the single-phase voltage A line and the single-phase voltage B line are canceled each other in a space near the three lines and can be advantageously reduced. In Patent Document 1, the effect is more enhanced by the following method.

Since the transmission characteristics of the single-phase voltage A line and the single-phase voltage B line in an actual wiring of power lines are intricately different from each other, even though signals are simply transmitted by carrier waves having opposite phases, an optimum canceling relationship cannot be always obtained. Therefore, when signals are transmitted to the single-phase voltage A line and the single-phase voltage B line, amplitudes and phases of the lines are designed to be able to be finely manually adjusted to make it possible to obtain a maximum canceling effect.

As described above, in the three-line type power line, the same signals in power line communication are transmitted to the voltage lines of two type in opposite phases in carrier waves to make it possible to reduce leak radio waves acting as unwanted radiation.

However, in Patent Document 1, a basic condition is included in which a data communication device necessarily uses all three power lines in power line communication. As well known, in a normal wiring of power lines, two lines of three lines are connected to each room or each AC power source outlet in house. For example, the single-phase voltage A line and the neutral line are connected to a living room, and the single-phase voltage B line and the neutral line are connected to children's room to distribute loads. Two different lines are popularly connected to different AC power source outlets in the same room. More specifically, it can be said that a wiring environment simultaneously using three lines as proposed by Patent Document 1 is very rare. Although all three wires for air-conditioners or cooking appliances using a single-phase 200-V power are connected, at present, the air-conditioners and the cooking appliances are very rare.

In a large number of buildings or large-scale transportation facilities (ships, trains, aircrafts, or the like), the single-phase three-line type wiring described above is not normally used, a single-phase two-line wiring or a wiring obtained by bundling a plurality of sets of single-phase two-line wirings is simply used. For this reason, it is general that a condition in which Patent Document 1 can be used is not satisfied.

Furthermore, this is also undesirable in terms of effective use of a wiring. Since the same information is transmitted to power lines of two physically independent systems, data communication is used at only half efficiency because pieces of information of two types can be originally transmitted by the power lines of the two systems. In the future, the power line communication will be probably popularly used as a LAN transmission path in a building, and large-volume information flowing in the transmission path typified by high-quality moving image will increase as information flowing in the transmission path. In consideration of this, a transmitting method that cannot independently use power lines of two systems is supposed to have a poor utility value.

PRIOR ART DOCUMENT

Patent Document

Patent Document 1: Unexamined Japanese Patent Publication No. S61-109431

SUMMARY OF THE INVENTION

A data communication system according to the present invention is a data communication system that transmits data by using a power line wiring as a transmission path, and includes: a first power line that transmits an AC power source voltage supplied from an external AC power source device; a second power line laid down near the first power line in parallel with the first power line and transmits the AC power source voltage simultaneously with the first power line; at least one first data communication device connected to the first power line; and at least one second data communication device connected to the second power line, the first data communication device and the second data communication device generate carrier waves having opposite phases by using a reference timing obtained from a waveform of the AC power source voltage, and the carrier waves are modulated with the data to generate a digital modulating signal.

In this manner, while two power lines are effectively used as independent transmission paths, leak radio waves can be reduced.

A data communication device according to the present invention is a data communication device that uses a power line wiring as a transmission path, and includes: a power line connecting unit connected to a power line; a reference timing generating unit that detects a zero-cross point of an AC power source voltage extracted from the power line connecting unit to generate a reference timing signal based on the timing; a digital modulating unit that performs digital carrier wave modulation by transmitted data to generate a digital modulating signal; a carrier wave generating unit that generates a carrier wave used in the digital modulating unit by using the reference timing signal; and a phase selecting unit that selects any one of an in-phase state or an anti-phase state of the wave output from the carrier wave generating unit to supply the selected wave to the digital modulating unit, phase selection in the phase selecting unit is performed depending on whether the power line connecting unit is connected to the first power line or the second power line, and the digital modulating signal output from the digital modulating unit is sent to the power lines through the power line connecting unit.

DETAILED DESCRIPTION OF THE INVENTION

Data communication systems and data communication devices according to embodiments of the present invention will be described below with reference to the drawings.

(First Embodiment)

Figure 1:
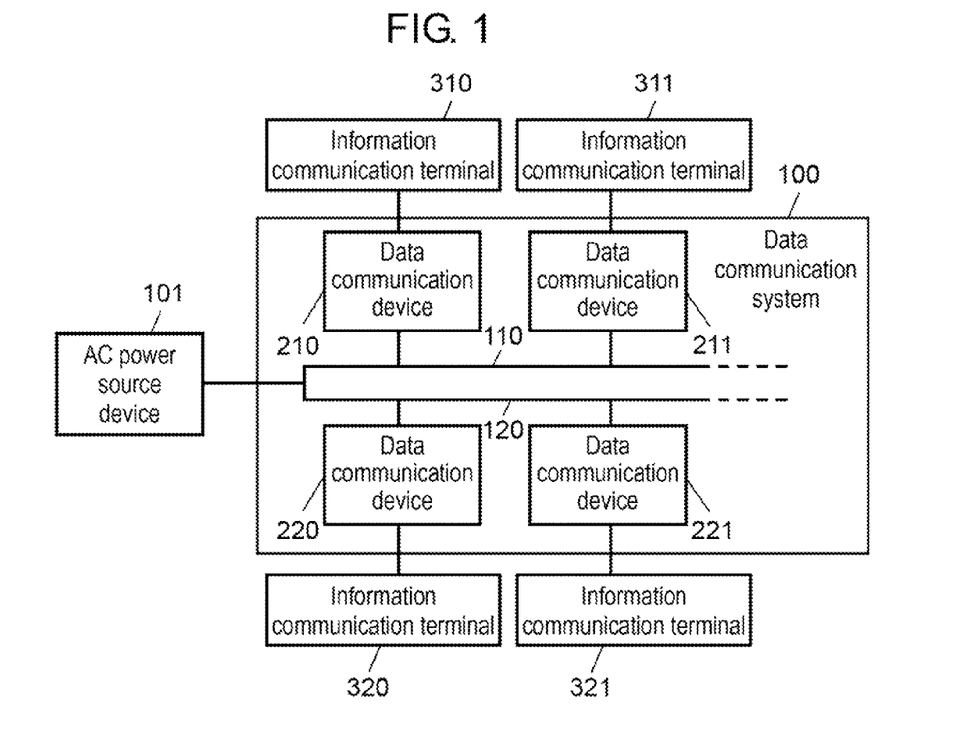
FIG. 1 is a block diagram showing an example of basic configuration of a data communication system in a first embodiment of the present invention.

A data communication system according to a first embodiment of the present invention will be described first. FIG. 1 is a block diagram showing an example of basic configuration of data communication system 100 using a power line wiring to which the present invention is applied. Data communication system 100 includes a power line (first power line) 110 that transmits a voltage from AC power source device 101 installed outside data communication system 100, power line (second power line) 120 that is laid down near power line 110 in parallel with power line 110 and transmits the voltage from AC power source device 101 simultaneously with power line 110, data communication devices (first data communication devices) 210 and 211 connected to power line 110, and data communication devices (second data communication devices) 220 and 221 connected to power line 120. In FIG. 1, two of data communication devices 210, 211, 220, and 221 connected to each of power lines 110 and 120 are shown for descriptive convenience. However, an arbitrary number (1 or more) of data communication devices can be connected to each of the power lines. AC power source device 101 is generally a large-scale electric generator operated by a power company, and supplies a voltage to data communication system 100 according to the embodiment through equipment for distributing electricity. However, as AC power source device 101, an intermediate-scale or small-scale dedicated AC power source device may be installed in a building or transportation facilities.

Information communication terminals 310, 311, 320, and 321 used by being connected to data communication devices 210, 211, 220, and 221, respectively, are typically personal computers that can be connected to the internet or the like. However, other information communication terminals each having a network connecting function can be used. For example, an audio-visual appliance having an internet connecting function, an electric home appliance, a video game machine, a data storing server, a mobile information terminal, a computer peripheral device such as a hard disk recording device or a printer, a networking gear such as a router or a wide area network connection modem are given. The most popular connection between data communication devices 210, 211, 220, and 221 and information communication terminals 310, 311, 320, and 321 is an interface of Ethernet (registered trademark) used as a LAN connection.

With this configuration, information communication terminals 310, 311, 320, and 321 can perform interactive communication with an arbitrary communicate terminal. When any one of information communication terminals 310, 311, 320, and 321 is connected to the external internet, all information communication terminals 310, 311, 320, and 321 can be connected to the internet through information communication terminals 310, 311, 320, and 321.

Figure 2:
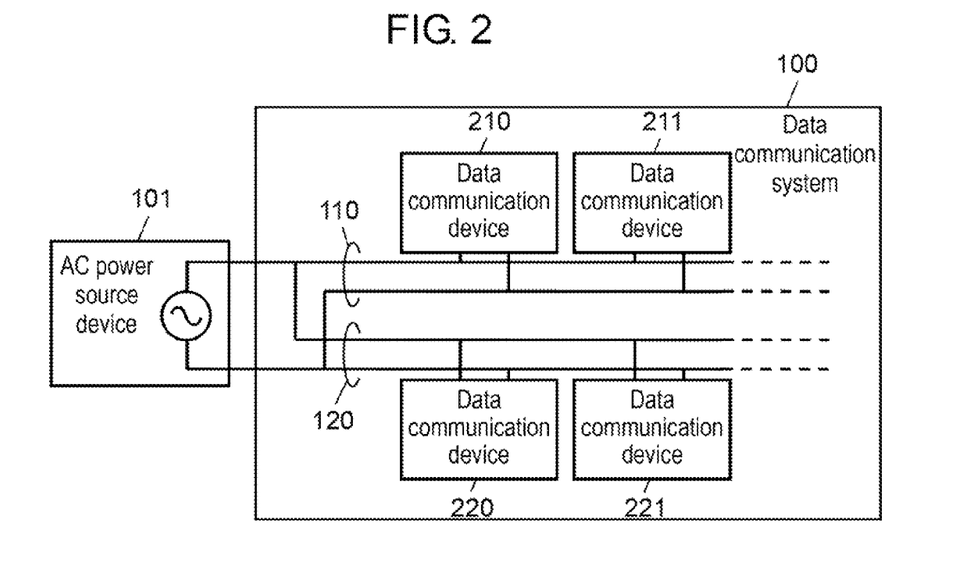
FIG. 2 is a concrete wiring diagram of the data communication system according to the first embodiment of the present invention.

FIG. 2 is a concrete wiring diagram of data communication system 100 according to the embodiment, and a diagram for explaining wirings of power line 110 and power line 120 in slightly detail. A single-phase AC voltage extracted from AC power source device 101 by two electric wires are branched by two outside AC power source device 101, and the two AC voltages are transmitted as power line 110 and power line 120. Data communication devices 210 and 211 are connected to power line 110 with two electric wires, data communication devices 220 and 221 are connected to power line 120 with two electric wires. Typically, the data communication devices are connected to an AC power source outlet used in house with a power supply plug. An output voltage from AC power source device 101 is typically 100 V, 115 V, 200 V, or the like, and has a frequency of 50 Hz or 60 Hz. However, specifications vary depending on standards and environments of countries. For example, in a passenger aircraft, 400 Hz may be used as a power supply frequency.

Two sets of power line 110 and power line 120 are laid down near in proximity to each other in parallel with each other, and can distribute loads on the power lines. When output signals from data communication devices 210, 211, 220, and 221 on power lines 110 and 120 have opposite phases at a carrier wave level, leak radio waves are canceled out in a space near power lines 110 and 120. As a result, unwanted radiation can be reduced. In an existing building, such a wiring is not generally laid down. However, the wiring can be relatively easily employed in a new building or transportation facilities (for example, ships, trains, and aircrafts) in which wirings can be easily changed.

Figure 3:
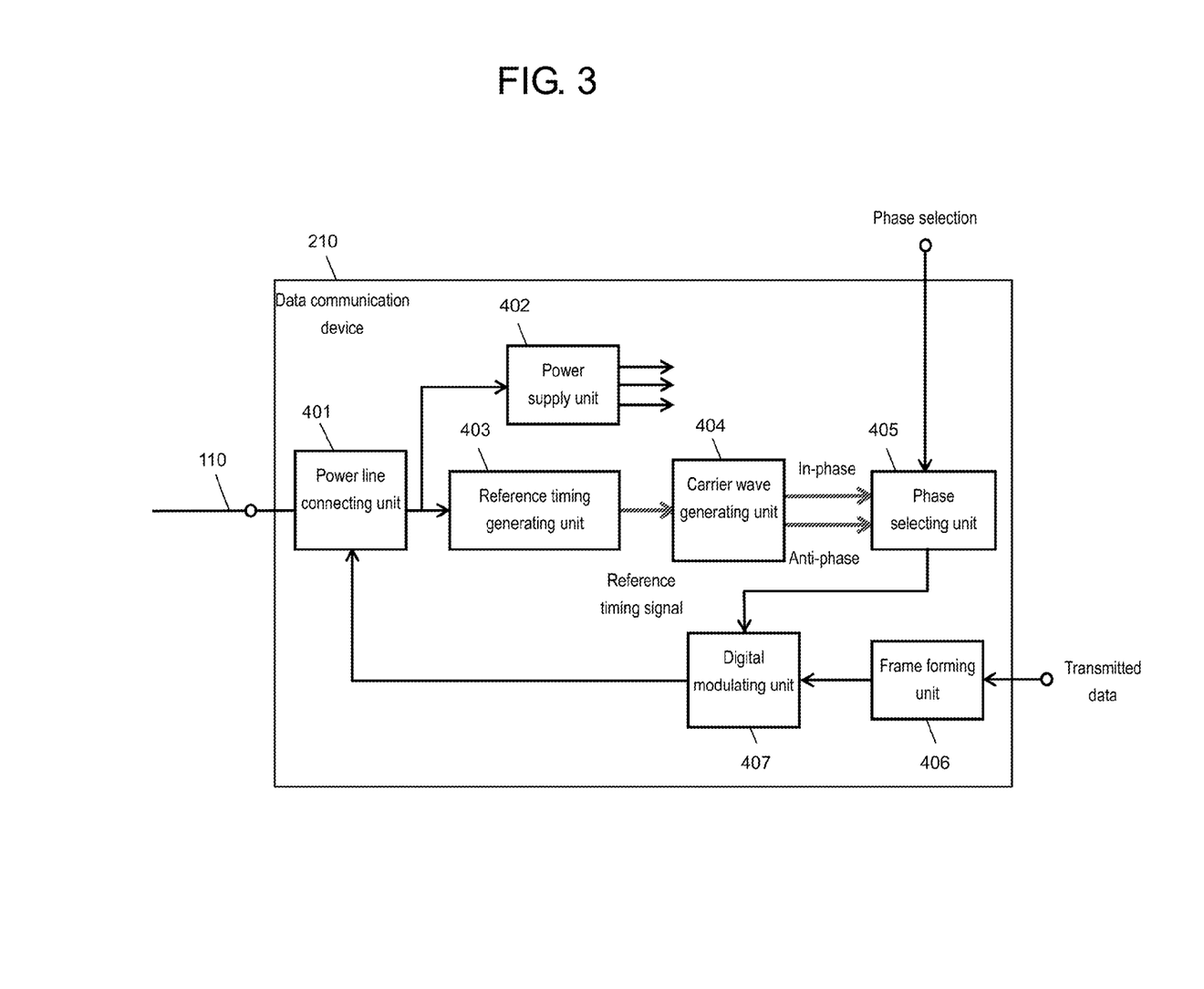
FIG. 3 is a block diagram showing an internal configuration of a data communication device included in a data communication system according to the first embodiment of the present invention.

FIG. 3 is a block diagram showing an internal configuration of data communication device 210 included in data communication system 100 according to the embodiment. Power line connecting unit 401 is connected to power line 110, and receives a voltage from AC power source device 101. The input voltage is converted into various DC voltages by power supply unit 402 to supply powers to the units in data communication device 210, respectively. At the same time, a zero-cross point of an AC voltage waveform (normally, a sine wave) is detected in reference timing generating unit 403 to output a reference timing signal. In carrier wave generating unit 404, a frequency and a phase of a carrier wave are determined by using the reference timing signal, and in-phase and anti-phase carrier waves are output. In phase selecting unit 405, based on an external setting designation, any one of the in-phase and anti-phase carrier waves is selected as a carrier wave to be used. On the other hand, a frame for data sent from information communication terminal 310 is formed by frame forming unit 406 to obtain a data structure suitable for communication.

As an example of a concrete process in frame formation, addition of synchronous information to obtain data synchronization, addition of an error correction/detection code to perform error control, interleaving to distribute continuous bit errors, diffusion scramble to prevent deviation of "0" and "1" in transmitted data, encryption to make communication contents secret, and the like are given. In digital modulating unit 407, a carrier wave output from phase selecting unit 405 is digitally modulated by transmitted data output from frame forming unit 406, and the resultant carrier wave is sent to power line 110 through power line connecting unit 401.

Figure 4:
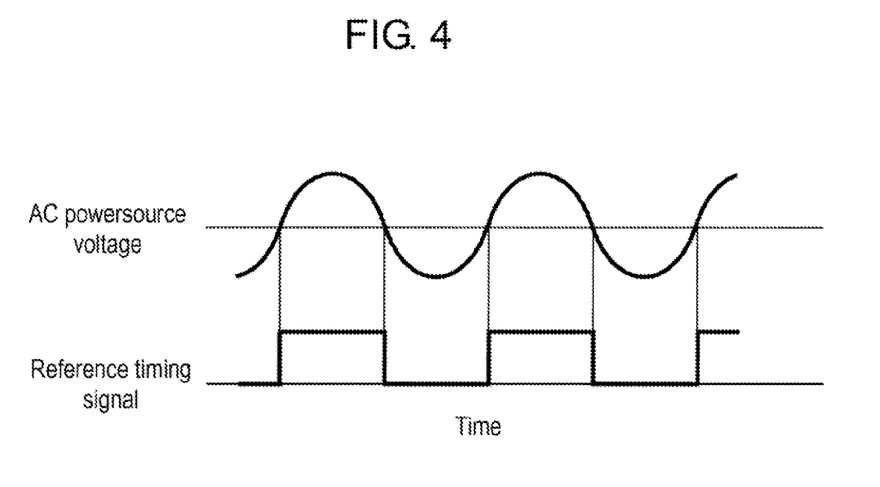
FIG. 4 is a waveform chart showing a relationship between a power supply voltage and a reference timing signal on a time axis in the data communication system according to the first embodiment of the present invention.

Reference timing generating unit 403 is easily realized by a voltage comparator that uses 0 V as a comparison voltage with respect to an input of an AC sine wave, and, as well known, can obtain a reference timing signal as shown in FIG. 4.

Figure 5:
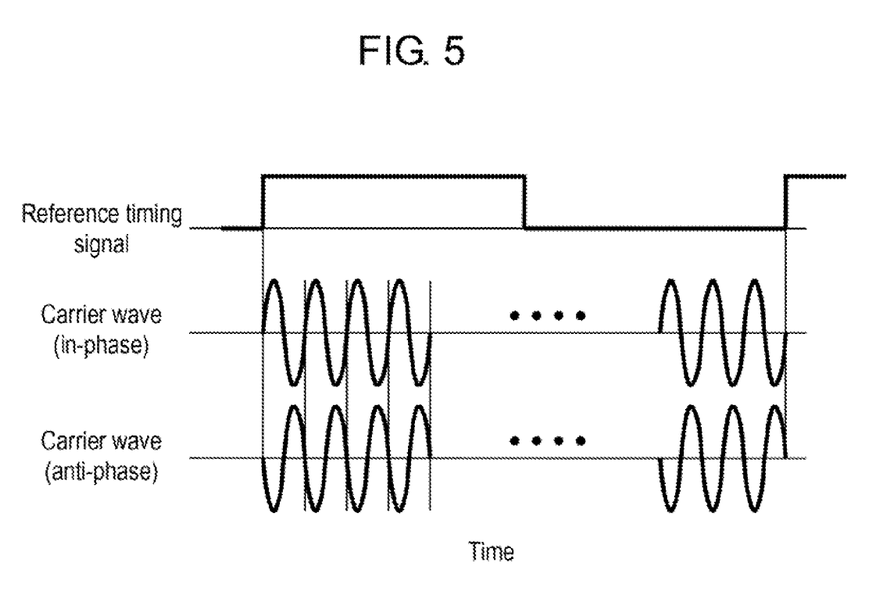
FIG. 5 is a waveform chart showing a relationship between a reference timing signal and a carrier wave on a time axis in the data communication system according to the first embodiment of the present invention.

In carrier wave generating unit 404, a phase/frequency synthesizer realized by a PLL (Phase Locked Loop) is generally used to obtain a carrier wave from a reference timing signal. As well known, the carrier wave that is a signal having a frequency that is integer times the frequency of the reference timing signal, and is based on the phase of the reference timing signal can be obtained. For example, when the reference timing signal has 50 Hz, a signal having 100 KHz that is 2000 times 50 Hz can be obtained, and a phase of the 100-KHz signal can be easily matched with a rising timing of the 50-Hz reference timing signal as shown in FIG. 5. Furthermore, the carrier wave signal is caused to pass through an inverter, as shown in FIG. 5, an anti-phase carrier wave can be obtained at the same time.

By using the data communication device having the above configuration, a normal-phase carrier wave is selected in data communication device 210 and data communication device 211, and an anti-phase carrier wave is selected in data communication device 220 and data communication device 221. In this case, leak radio waves of power line 110 and power line 120 can be canceled out. In terms of identification of power lines 110 and 120 and phase selection of data communication devices 210 and 211, for example, a mark "A" is put on a power source outlet connected to power line 110, a mark "B" is put on a power source outlet connected to power line 120, "A/B" is displayed on a phase selecting switch for data communication devices 210 and 211. As a result, a selection setting can be certainly performed.

The selection of an in-phase state and an anti-phase state is made on the carrier waves given to digital modulating unit 407 in FIG. 3. An output signal from digital modulating unit 407 can also be directly output or output while being inverted in phase selectively. However, in this case, the phase inverting means is required to have a high bandwidth.

In FIG. 3, each functional block is described as an independent hardware concept. However, the functional blocks can be realized by batch processing performed by a recent high-speed digital signal processing (DSP) semiconductor chip, as a matter of course.

(Second Embodiment)

A data communication system and a data communication device according to a second embodiment of the present invention will be described below. A characteristic feature of the embodiment is that, as digital modulating schemes, ASK (Amplitude Shift Keying) is used for primary modulation, and OFDM (Orthogonal Frequency Division Multiplex) is used for secondary modulation.

In high-speed power line communication standardized in our country, a frequency band of 2 to 30 MHz can be used. The OFDM is a digital modulating scheme for a multi-carrier. In this scheme, an applied band is not transmitted by one digital modulation (single-carrier scheme), and the band is divided into several hundred to several thousand sub-carriers, and the sub-carrier waves are digitally modulated and transmitted one by one (multi-carrier scheme). Since adjacent sub-carriers are generated to have an orthogonal relationship, a guard band need not be installed between the sub-carriers unlike in normal frequency division multiplexing. Even though frequency spectrums of signals overlap, the signals can be advantageously transmitted without interfering with each other.

Figure 6:
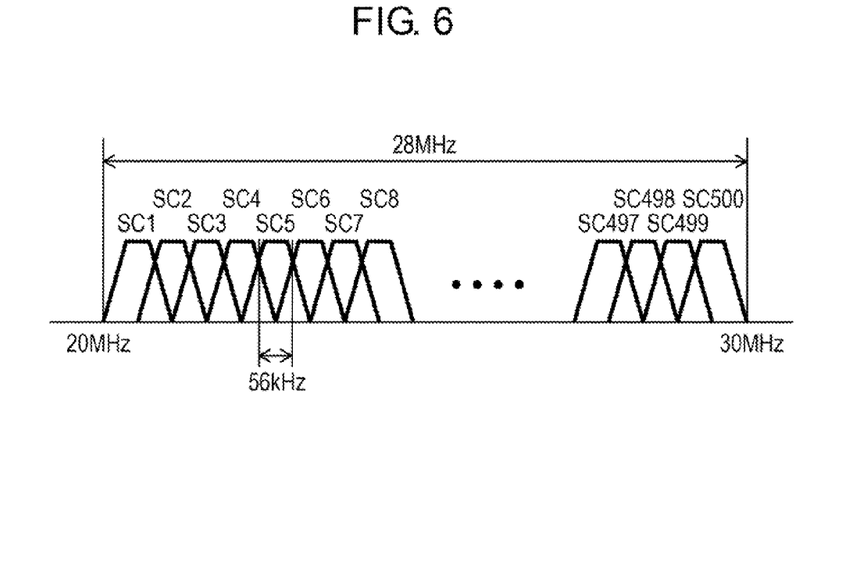
FIG. 6 is a spectrum diagram of an OFDM signal in a data communication system according to a second embodiment of the present invention.

More specifically, efficiency in the use of frequencies on transmission advantageously becomes very high. A band of one sub-carrier wave is narrow, and a transmission rate is low. For this reason, the scheme also has a characteristic feature that is strong to noise or multiple reflection on a transmission path. FIG. 6 shows an example of an OFDM signal. FIG. 6 is a diagram obtained when 500 sub-carriers are multiplexed in a band of 2 to 30 MHz permitted in power line communication.

As shown in FIG. 6, in a bandwidth of 28 MHz, for example, since 500 sub-carrier waves (SC1 to SC500 in FIG. 6) are multiplexed, a frequency of one sub-carrier wave is 56 KHz. When the frequency is expressed in a reciprocal cycle, about 18 microseconds are obtained. More specifically, in OFDM, a digital signal (to be referred to as a symbol hereinafter) of a 18-μs cycle is digitally modulated and transmitted.

Incidentally, since a zero-cross point of a 50-Hz or 60-Hz AC power source voltage waveform is detected in each of data communication devices 210, 211, 220, and 221 connected to power lines 110 and 120, the accuracy of detecting the zero-cross point is sufficiently influenced by factors such as accuracy of parts, aging, and an environmental temperature, and sufficient accuracy may not be obtained. When modulation is performed by a single carrier having a single frequency of a maximum frequency of 30 MHz, predetermined phase management is required to be performed to a signal having a frequency of 30 MHz and is difficult to be performed depending on environments. On the other hand, as described above, the multi-carrier scheme is employed in the OFDM, and the minimum sub-carrier frequency is 2 MHz that is smaller than the above frequency by one digit number. Therefore, since phase management that is difficult in a high-frequency carrier can be performed in a low-frequency carrier, even though the accuracy of detecting a zero-cross point is not sufficient, a canceling effect of leak radio waves can be maintained.

In this case, it will be described below that, for canceling of the leak radio wave in a space near power lines 110 and 120, a modulating scheme includes conditions. In order to cancel the leak radio waves, the fact that transmitted signals that are actually modulated have opposite phases is necessary more than the fact that carrier waves used in digital modulation have opposite phases. For this reason, in digital modulation, when phase modulation such as PSK or 4PSK or phase amplitude modulation such as 16QAM or 64QAM is used, and a phase of a transmitted signal depends on the contents of transmitted data. Leak radio waves are not always canceled out in a space, and the leak radio waves may be rather added to each other to increase a radio field intensity. Therefore, in the digital modulation, a scheme of an amplitude modulation system in which a phase of a transmitted signal is not changed by modulation, i.e. ASK or multi-valued ASK such as 4ASK needs to be used.

For example, leak radio waves are canceled out in the ASK when each of modulation signals of two types sends "1" (a carrier wave is directly output). When one modulation signal sends "1", and when the other modulation signal sends "0" (when no carrier wave is output), a canceling effect cannot be obtained. However, in a long term, since the case in which both the signals send "1" is present at a certain probability, a canceling effect is averagely exerted. As in the multi-valued ASK, a canceling effect can be averagely obtained. The above digital data value "1" or "0" modulated and sent here is also called a symbol.

Figure 7:
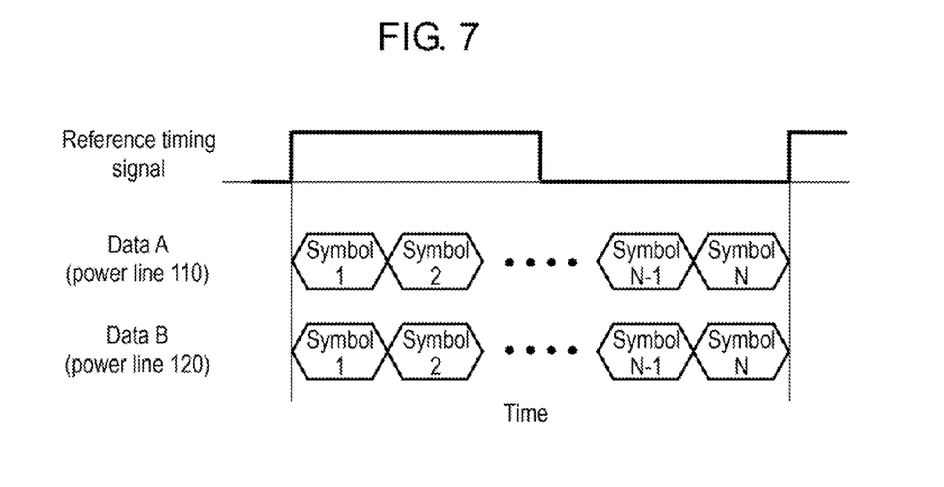
FIG. 7 is a diagram showing a relationship between a reference timing signal and symbol phases of data A and data B transmitted through a power line in the data communication system according to the second embodiment of the present invention.
Figure 8A:
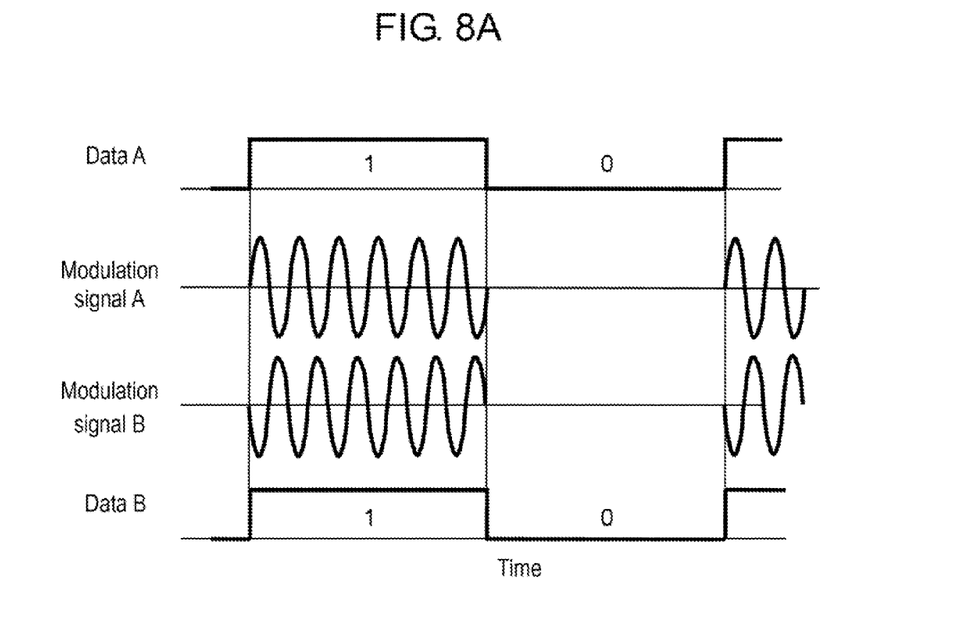
FIG. 8A is a diagram for explaining a canceling effect of leak radio waves when ASK is used as primary modulation serving as digital modulation in the data communication system according to the second embodiment of the present invention, and a diagram showing a case in which symbol phases of data A and data B are equal to each other.
Figure 8B:
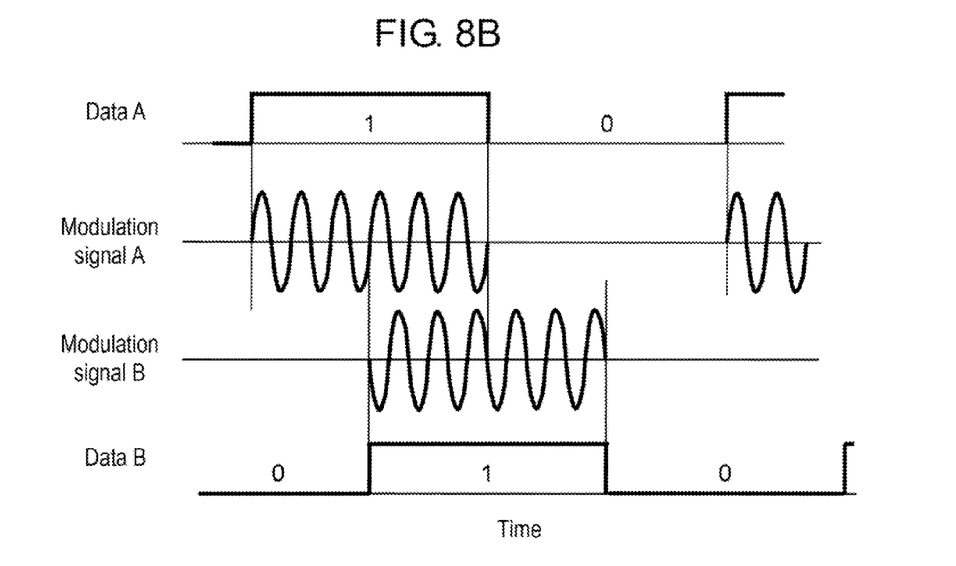
FIG. 8B is a diagram for explaining a canceling effect of leak radio waves when ASK is used as primary modulation serving as digital modulation in the data communication system according to the second embodiment of the present invention, and a diagram showing a case in which symbol phases of data A and data B are different from each other by about a half cycle.

Furthermore, in the embodiment, the phases of the symbols transmitted through power line 110 and power line 120 are made equal to each other. FIG. 7 is a diagram showing a relationship between symbol phases of a reference timing signal, data A transmitted through power line 110, and data B transmitted through power line 120 in the data communication system according to the embodiment. In this manner, the symbol phases of both the signals are made equal to each other to make it possible to effectively cancel leak radio waves out. The reason will be explained with reference to FIG. 8.

FIGS. 8A and 8B are diagrams for explaining a canceling effect of leak radio waves when ASK is used as primary modulation serving as digital modulation in the data communication system according to the embodiment. In this case, for descriptive convenience, it is assumed that both the values of data A and data B are "1" and "0", respectively. FIG. 8A is a diagram showing a case in which symbol phases of data A and data B are equal to each other. In this case, since periods (periods in which data is "1") in which sub-carriers of modulation signal A and modulation signal B are present completely overlap, leak radio waves generated by modulation signal A and modulation signal B are effectively canceled out. The above digital data value "1" or "0" modulated and sent here is also called a symbol.

FIG. 8B is a diagram showing a case in which symbol phases of data A and data B shift from each other by a half cycle. In this case, since periods (periods in which data is "1") in which sub-carriers of modulation signal A and modulation signal B are present half overlap, a canceling effect of leak radio waves generated by modulation signal A and modulation signal B is down by half in comparison with the case in FIG. 8A.

In this manner, when the ASK and the OFDM are used as a transmitting scheme of PLC, symbol phases of data transmitted with two adjacent power lines 110 and 120 are made equal to each other to make it possible to effectively cancel out the leak radio waves from power line 110 and power line 120.

(Third Embodiment)

Data communication system 200 according to a third embodiment of the present invention will be described below with reference to FIGS. 9 and 10. In the first embodiment and the second embodiment, a power line of a single-phase 2-line type is used as a power line for data communication. However, in the embodiment, a power line of a 3-phase 4-line type is used as a power line for data communication.

Figure 9:
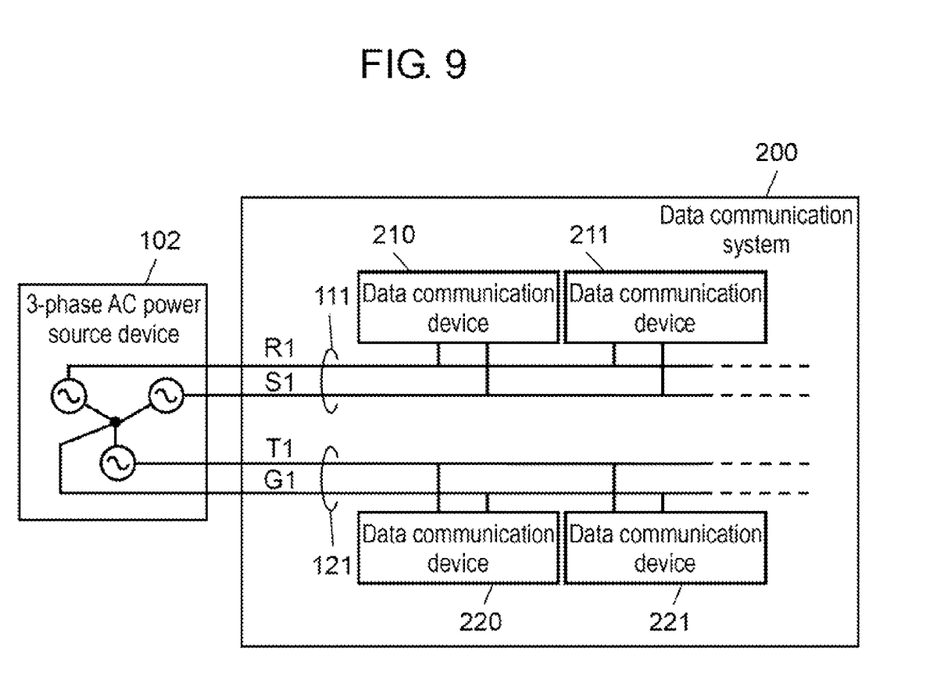
FIG. 9 is a diagram showing a concrete wiring of a data communication system according to a third embodiment of the present invention.

FIG. 9 is a diagram showing a concrete wiring of data communication system 200 according to the embodiment. In FIG. 9, power line 111 is configured by two lines, i.e., R-phase line R1 and S-phase line S1 of 3-phase AC power source device 102, and data communication devices 210 and 211 are connected to power line 111. Power line 121 is configured by two power lines, i.e., T-phase line T1 and ground line G1, and data communication devices 220 and 221 are connected to power line 121.

Two sets of power line 111 and power line 121 are adjacent to each other, and digital modulation is performed by using carrier waves the polarities of which are inverted to make it possible to cancel leak radio waves from the power lines out.

Figure 10:
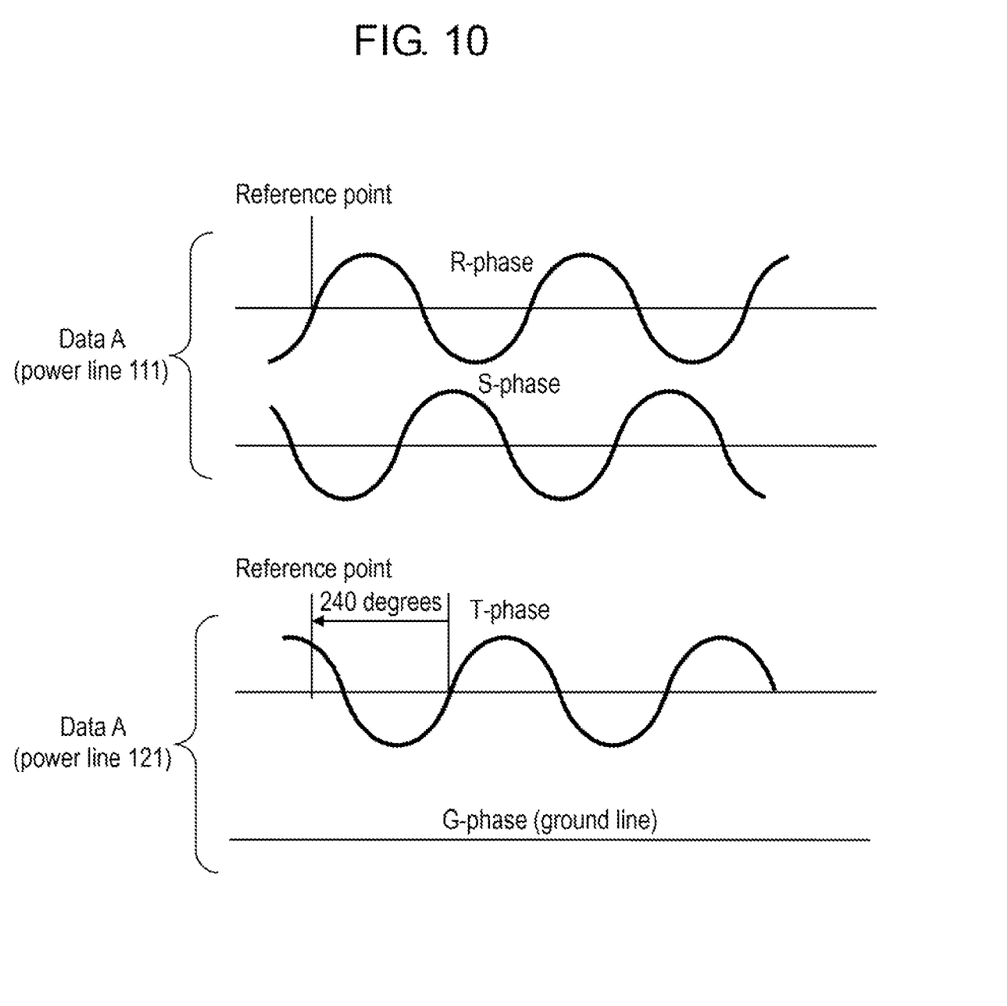
FIG. 10 is a relationship between phases of AC voltages transmitted through 3-phase lines R1, S1, and T1 of a 3-phase AC power source device of the data communication system according to the third embodiment of the present invention.

FIG. 10 shows a relationship between phases (phases R, S, and T) of AC voltages transmitted through 3-phase lines R1, S1, and T1 of 3-phase AC power source device 102. As shown in FIG. 10, with reference to the R phase, the S phase is delayed by 120 degrees, and the T phase is delayed by 240 degrees. When a carrier wave of data A transmitted with power line 111 is generated with reference to a zero-cross point of an R-phase voltage, a carrier wave of data B transmitted with power line 121 needs to generate a carrier wave of an anti-phase with reference to a point of time 240 degrees before a zero-cross point of a T-phase voltage. When the carrier waves are generated at the timing, the phases of the carrier waves can be accurately reversed between the two sets of power lines. For this reason, leak radio waves from the power lines can be accurately canceled out.

In the embodiment, power line 111 is configured by two lines, i.e., R-phase line R1 and S-phase line S1, and power line 121 is configured by two lines, i.e., T-phase line T1 and ground line G1. However, the combinations are arbitrary, and other combination may be used. In this case, a reference timing signal that generates a carrier wave may be generated depending on the combinations.

As described above, according to the embodiment, a data communication system and a data communication device that can perform data communication that can reduce unwanted radiation while performing independent data communication of each of the power lines of two systems.

The present invention can be used in a system that performs high-speed interactive data communication in a building such as in a house, in a shop, in an office, or in a factory or in a ship, in a train, or in an aircraft by using a power line wiring laid down therein. Since use of two sets of power lines installed in proximity to each other in parallel to each other is set as only a condition, especially, the present invention can be easily introduced to transportation facilities (trains or aircraft) in which new power lines can be easily laid down or wirings can be easily changed.

Reference Marks in the Drawings
  100, 200 data communication system
  101 AC power source device
  102 3-phase AC power source device
  110, 111 (first) power line
  120, 121 (second) power line
  210, 211, 220, 221 data communication device
  310, 311, 320, 321 information communication terminal
  401 power line connecting unit
  402 power supply unit
  403 reference timing generating unit
  404 carrier wave generating unit
  405 phase selecting unit
  406 frame forming unit
  407 digital modulating unit

The invention claimed is:

1. A data communication system that transmits data by using a power line wiring as a transmission path, the data communication system comprising:
  a first power line that transmits an AC power source voltage supplied from an external AC power source device;
  a second power line laid down near the first power line in parallel with the first power line and transmitting the AC power source voltage simultaneously with the first power line;
  at least one first data communication device connected to the first power line; and
  at least one second data communication device connected to the second power line, wherein
  the first data communication device and the second data communication device generate carrier waves having opposite phases to each other by using a reference timing obtained from a waveform of the AC power source voltage,
  the carrier waves having opposite phases to each other include an in-phase carrier wave having a same phase as an output signal of a carrier wave generating unit and an anti-phase carrier wave having an opposite phase to the phase of the output signal of the carrier wave generating unit,
  the first data communication device and the second data communication device select any one of the in-phase carrier wave and the anti-phase carrier wave, based on a phase selection setting, and
  the carrier waves selected are modulated with the data to generate a digital modulating signal.

2. A data communication system according to claim 1, wherein
  the reference timing is generated with reference to a zero-cross point of a waveform of the AC power source voltage.

3. The data communication system according to claim 1, wherein
  the digital modulating signal transmitted to the first power line and the second power line is formed by using digital amplitude modulation of at least two values is used as primary modulation and OFDM (Orthogonal Frequency Division Multiplex) is used as secondary modulation.

4. The data communication system according to claim 3, wherein
  symbol phases of the digital modulating signals are equal to each other in the first power line and the second power line.

5. The data communication system according to claim 1, wherein
  the AC power source device is a 3-phase 4-line type AC power source device that transmits a 3-phase AC voltage with four lines, and the first power line and the second power line are configured by arbitrary two of the four lines.

6. A data communication device that uses a power line wiring as a transmission path, comprising:
  a power line connecting unit connected to a power line;
  a reference timing generating unit that detects a zero-cross point of an AC power source voltage extracted from the power line connecting unit to generate a reference timing signal;
  a digital modulating unit that performs digital carrier wave modulation by using transmitted data to generate a digital modulating signal;
  a carrier wave generating unit that generates a carrier wave to be used in the digital modulating unit by using the reference timing signal; and
  a phase selecting unit that selects any one of an in-phase state or an anti-phase state of the wave output from the carrier wave generating unit to supply the selected wave to the digital modulating unit, wherein phase selection in the phase selecting unit is performed depending on whether the power line connecting unit is connected to the first power line or the second power line, and the digital modulating signal output from the digital modulating unit is sent to the power lines through the power line connecting unit.

7. The data communication device according to claim 6, wherein
the digital modulating unit uses digital amplitude modulation of at least two values as primary modulation and uses OFDM as secondary modulation.

8. The data communication system according to claim 2, wherein
the digital modulating signal transmitted to the first power line and the second power line is formed by using digital amplitude modulation of at least two values is used as primary modulation and OFDM (Orthogonal Frequency Division Multiplex) is used as secondary modulation.

9. The data communication system according to claim 2, wherein
the AC power source device is a 3-phase 4-line type AC power source device that transmits a 3-phase AC voltage with four lines, and the first power line and the second power line are configured by arbitrary two of the four lines.

10. The data communication system according to claim 3, wherein
the AC power source device is a 3-phase 4-line type AC power source device that transmits a 3-phase AC voltage with four lines, and the first power line and the second power line are configured by arbitrary two of the four lines.

11. The data communication system according to claim 4, wherein
the AC power source device is a 3-phase 4-line type AC power source device that transmits a 3-phase AC voltage with four lines, and the first power line and the second power line are configured by arbitrary two of the four lines.

12. The data communication device according to claim 6, wherein
symbol phases of the digital modulating signals are equal to each other in the first power line and the second power line.

13. The data communication device according to claim 6, wherein
the AC power source device is a 3-phase 4-line type AC power source device that transmits a 3-phase AC voltage with four lines, and the first power line and the second power line are configured by an arbitrary two of the four lines.

* * * * *